June 18, 1946.  W. G. KÖGEL  2,402,416
REFRIGERATION
Filed Aug. 26, 1943
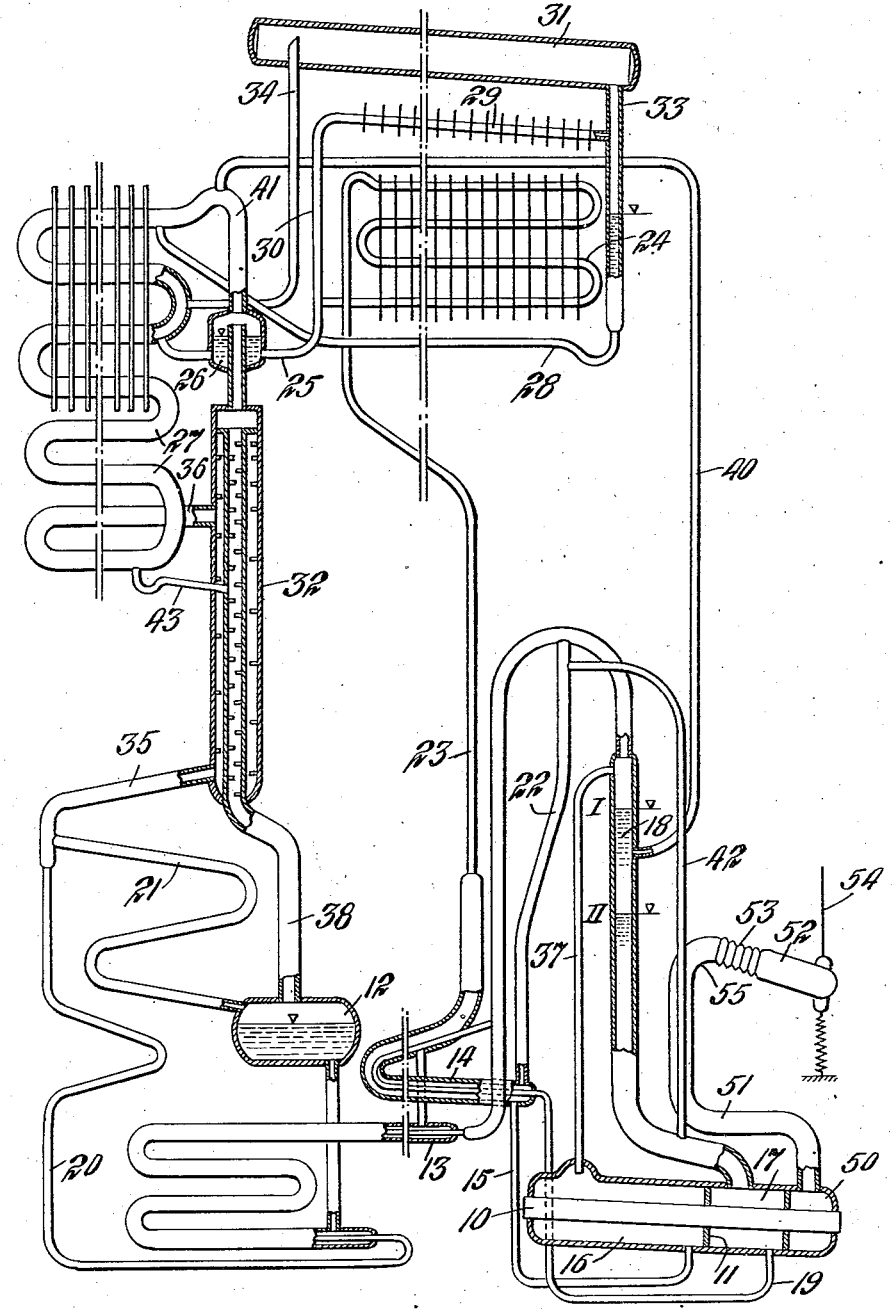
INVENTOR.
Wilhelm Georg Kögel
BY
D. E. Heath
ATTORNEY Patented June 18, 1946

2,402,416

UNITED STATES PATENT OFFICE 2,402,416

REFRIGERATION

Wilhelm Georg Kögel, Stockholm, Sweden

Application August 26, 1943, Serial No. 500,031
In Sweden May 19, 1943

5 Claims. (Cl. 62—119.5)

My invention relates to a method of and an apparatus for heat transfer by vapour and more particularly to heat transfer by vapour for removal of frost from a refrigerator cooling surface.

It is an object of the invention to provide a selfstopping heat transfer system in which vapours are used as a heat transfer medium. It is another object to remove frost quickly. A further object is to provide a selfstopping method of and an apparatus for this frost removal.

I utilize vapour expelled in the boiler of the refrigerating apparatus to heat frost on an evaporator and to cause it to melt and I further cause variations of a liquid level to control the passage of boiler vapours to the evaporator, said variations being caused by means of an auxiliary pump in cooperation with a hermetically closed heat transfer system or any other controllable heat source. My invention will be more fully explained in the following description in connection with the accompanying drawing, wherein the single figure shows diagrammatically a heat operated refrigeration apparatus embodying my invention. The refrigerating apparatus is of the hermetically closed type working with an inert gas such as hydrogen and with ammonia and water as refrigerant and absorption medium respectively.

Referring to the drawing the refrigeration system includes a flue 10 by means of which heat is transferred to a boiler from a heat source such as a gas or kerosene flame or an electric heater, not shown. The boiler is divided into two chambers 16 and 17 by means of a separating wall 11. From chamber 16 rich solution is pumped into the upper part of a stand pipe 18 by means of a vapour lift pump 37. The normal liquid level in the stand pipe 18 is identified by I. From the stand pipe weak solution that is, refrigerant-absorbent solution weak in refrigerant enters the chamber 17, from which it flows to the absorber 21 through a conduit 19, heat exchangers 14 and 13 and finally a conduit 20. From an absorber storage vessel 12 rich solution passes through the outer pipe of the heat exchanger 13, the heat exchanger 14, through a conduit 15 into chamber 16 and from there through the pump 37 into the stand pipe 18. Vapours expelled in the boiler or generator flow through a conduit 22, the outer pipe of the heat exchanger 14 and a conduit 23 to a main condenser 24 of the system.

From the air-cooled condenser 24, liquefied refrigerant flows to an evaporator 27 through a conduit 25 in which a precooler 26 is inserted. Refrigerant vapours not liquefied in condenser 24 pass through a conduit 30 to a second condenser 29, from which liquefied refrigerant flows through a conduit 28 to the upper part of evaporator coil 27, said part being adapted to work as a room cooler in a refrigerator storage compartment, not shown. Refrigerant not evaporated during its passage through the evaporator coil is drained through a conduit 43 into the inner pipe of a gas heat exchanger 32. A pressure vessel 31 is interconnected with the condenser system by means of a conduit 33 and the circulating system of the inert gas by means of a conduit 34.

These parts of the apparatus operate in a well known manner. The liquid refrigerant introduced into evaporator coil 27 diffuses into the stream of inert gas flowing from absorber 21, conduit 35, the outer pipe of gas heat exchanger 32, evaporator coil 27, conduit 41, the inner pipe of gas heat exchanger 32, conduit 38, absorber storage vessel 12 and back to the absorber.

It is desirable to remove frost from the evaporator at intervals both on account of its thermal insulating property and also for sanitary reasons. For removal of the frost I provide a vapour conduit 40 from the upper part of stand pipe 18 to the top of conduit 41, or to some other part of the condenser system or in certain cases to pressure vessel 31. Through this conduit 40 boiler vapours may be introduced into evaporator coil 27 directly or some other parts of the system which have an open communication with said evaporator coil. Conduit 40 is connected to stand pipe 18 at a point just below the normal level I of the liquid. Under normal conditions vapour is unable to pass into conduit 40 and accordingly the refrigerator operates in a conventional manner. The vapour lift pump 37 is dimensioned as to be able to lift the absorption solution to the level I, this level being high enough to permit absorption solution to pass over the overflow of conduit 20 into absorber coil 21. According to my invention, however, I provide a second vapour lift pump 42, through which liquid is lifted from the lower part of stand pipe 18 into the upper part of pipe 22 or to any other suitable part outside the stand pipe. Under normal conditions this pump 42 does not operate and consequently it has no influence on the operation of the apparatus. By expelling vapours in vapour lift pump 42 liquid may be lifted from the lower part of the stand pipe 18 to such an extent that the liquid level in the stand pipe is changed to a lower level II just beneath the entrance to the separate vapour conduit 40. The lowering of the generator level causes, on the one hand, an interruption of the flow of absorbent into the absorber 21, on the other hand a passage of boiler vapours into the evaporator 27 through conduit 40. Accordingly the temperature of the evaporator rapidly raises and the frost is removed. The increase in temperature is due, not only to the entrance of boiler vapours into the evaporator, but also as a result of the interrupted flow of absorbent through the absorber, resulting in an interruption of the gas circulation through the evaporator.

In order to make it possible to start the auxiliary pump 42 at will, I provide separate heating means. Auxiliary pump 42 is connected in intimate heat exchange relation to a separate hermetically closed heat transfer system including a boiler member 50 and heat transmitting part 51—55, a flexible pipe 53 and a container 52. The boiler part 50 is arranged in heat conducting relation with the hottest part of the flue 10, thus continuously receiving heat from the heat source of the refrigerator. The container 52 may be moved upwardly and downwardly by means of a control member 54. The system includes certain quantity of a heat transfer liquid. Under normal conditions the liquid is accumulated in container 52. The other parts of the system are dry and filled with overheated vapour. Because the overheated vapour is not able to transmit any substantial quantity of heat from boiler part 50, there is no pumping going on in auxiliary pump 42. In order to start the pump the container 52 is lifted, so as to cause liquid to flow into boiler part 50, when it begins to evaporate. As a heat transmitting medium I use xylol, gasoline, kerosene or some other liquid having a high boiling point. Due to the high temperature of the boiler part 50 the vapourization of the liquid may be too rapid and liquid will be forced back into container 52 by the vapour. In order to avoid such a rapid boiling I prefer to replace a part, for example, 50% of the heat transmitting liquid by a liquid having a lower boiling temperature such as ethylic alcohol. At the entrance of this liquid mixture into the hot parts of the system the alcohol at first evaporates causing a rapid increase of the pressure and thus preventing too rapid a boiling of the xylol.

The moving of container 52 may be obtained by means known per se. The time interval during which the container has to be kept in the lifted position generally is limited to a small part of a minute. After the liquid having been emptied into boiler part 50 of the system the vapour condenses partly at the place of heat conducting relation between the system and the vapour lift pump 42, partly in container 52. By means of cooling flanges or other suitable cooling means on the container and/or by means of an inert gas in the system the ratio between these two parts of the total condensation may be varied within wide limits. However, due to the condensation in the container 52 all liquid after a definite time will return to this container. Container 52, after having been emptied, is immediately moved into its normal position, as shown in the drawing, by a coiled spring attached thereto. Thereafter, all of the liquid will accumulate in this container. After a certain time the heat transmission to pump 42 accordingly will be interrupted. This is the end of the defrosting period and the refrigerator begins to operate again.

It is obvious that the heat transfer system may be replaced by another heat source controllable by means of a switch or a valve arranged so that the heat production can be started at will and, preferably, be interrupted automatically after a predetermined interval of time.

Reference is made to applicant's prior application S. N. 449,761, filed July 4, 1942, for generic claims to defrosting, and to the Kögel and Widell application, S. N. 475,334, filed Feb. 10, 1943, for generic claims directed to the secondary heating system.

Various changes and modifications may be made within the scope of the invention which is set forth in the following claims.

What I claim is:

1. In an absorption refrigerating system including a generator, a condenser, an evaporator and an absorber, said generator including a substantially horizontally arranged vessel, a stand pipe and a vapor lift pump for lifting absorption liquid from the vessel into said stand pipe from whence said liquid flows by gravity into said absorber, a conduit having one end connected to said stand pipe below a normal liquid level therein and having its opposite end connected to said evaporator, and means for lowering the normal liquid level in said stand pipe whereby flow of absorption liquid from said stand pipe to said absorber is stopped and flow of vapor from said stand pipe to said evaporator is commenced.

2. In an absorption refrigerating system including a generator, a condenser, an evaporator and an absorber, said generator including a vessel having a substantially horizontal heating flue, a stand pipe and a vapor lift pump for lifting liquid from said vessel into said stand pipe wherein said liquid is maintained at a predetermined normal level, a conduit having one end connected to said stand pipe below the normal liquid level therein and having its opposite end connected to said evaporator, and a second vapor lift pump for lifting liquid from said stand pipe whereby the liquid level in said stand pipe is lowered and vapors pass from said stand pipe to said evaporator through said connecting conduit.

3. In an absorption refrigeration system including a generator, a condenser, an evaporator and an absorber, said generator including a substantially horizontally arranged vessel having a plurality of chambers therein, conduits connecting the chambers of the vessel to the absorber at different levels, one of said chambers receiving absorption liquid from the absorber, a standpipe extending upwardly from another of the chambers, a vapor lift pump for lifting absorption liquid from one chamber into the standpipe for flow through the second chamber and conduit to the absorber, means for heating the chambers, a conduit having one end connected to the standpipe below the normal liquid level therein and its opposite end connected to the evaporator, and a manually controlled vapor lift pump for withdrawing liquid from said standpipe whereby the liquid level in said standpipe is lowered to permit vapor to flow from the standpipe to the evaporator through the connecting conduit.

4. In an absorption refrigeration system including a generator, a condenser, an evaporator and an absorber, said generator including a substantially horizontally arranged vessel having a plurality of chambers therein, conduits connecting two of the chambers of the vessel to the absorber at different levels, a standpipe extending upwardly from the second chamber, a vapor lift pump for lifting absorption liquid from the first chamber into the standpipe, a conduit having one end connected to the standpipe below the normal liquid level therein and its opposite end connected to the evaporator, a second vapor lift pump for withdrawing liquid from the standpipe to lower the liquid level therein and cause vapor to flow from the standpipe to the evaporator through the connecting conduit, a third chamber in the vessel, means for supplying heat to the three chambers of the vessel, and manually controlled means for utilizing the heat from the third chamber to operate the second vapor lift pump.

5. In an absorption refrigeration system including a generator, a condenser, an evaporator and an absorber, said generator including a substantially horizontally arranged vessel having three separate chambers and a heating flue extending through the chambers, conduits connecting the first and second chambers of the vessel to the absorber at different levels, a standpipe extending upwardly from the second chamber, a conduit having one end connected to the standpipe below the normal liquid therein and its opposite end connected to the evaporator, a vapor lift pump for lifting absorption liquid from the first chamber into the standpipe, a second vapor lift pump for withdrawing liquid from said standpipe to lower the liquid level therein and cause vapor to flow from the standpipe to the evaporator through the connecting conduit, a conduit connected to the third chamber of the vessel and arranged in heat exchange relation to the second vapor lift pump, and means operable intermittently to supply a volatile heating medium to the third chamber of the vessel to operate the second vapor lift pump.

WILHELM GEORG KÖGEL.